(12) United States Patent
Uranishi

(10) Patent No.: US 8,317,405 B2
(45) Date of Patent: Nov. 27, 2012

(54) ROLLING BEARING

(75) Inventor: Takeharu Uranishi, Habikino (JP)

(73) Assignee: JTEKT Corporation, Osaka (JP)

( * ) Notice: Subject to any disclaimer, the term of this patent is extended or adjusted under 35 U.S.C. 154(b) by 491 days.

(21) Appl. No.: 12/591,680

(22) Filed: Nov. 27, 2009

(65) Prior Publication Data
US 2010/0158425 A1    Jun. 24, 2010

(30) Foreign Application Priority Data
Dec. 24, 2008    (JP) .................................. 2008-328025

(51) Int. Cl.
*F16C 33/58* (2006.01)

(52) U.S. Cl. ..................................................... 384/564

(58) Field of Classification Search .................. 384/513, 384/548, 558, 564, 565, 568, 569
See application file for complete search history.

(56) References Cited

U.S. PATENT DOCUMENTS

| 1,202,876 A | * | 10/1916 | Moore | ......................... | 384/564 |
| 2,074,182 A | * | 3/1937 | Heim | ........................... | 384/564 |
| 2,792,619 A | * | 5/1957 | Komm | ........................... | 384/564 |
| 3,351,398 A | * | 11/1967 | Park et al. | ..................... | 384/564 |
| 3,667,822 A |   | 6/1972 | Armstrong |  |  |
| 5,071,265 A |   | 12/1991 | Bowen et al. |  |  |

FOREIGN PATENT DOCUMENTS

| EP | 1 482 191 A2 | 12/2004 |
| EP | 1 632 685 A1 | 3/2006 |
| JP | U-63-142419 | 9/1988 |
| JP | A-2001-208053 | 8/2001 |

OTHER PUBLICATIONS

European Search Report issued in European Patent Application No. 09 17 7895 on Mar. 2, 2010.

* cited by examiner

*Primary Examiner* — James Pilkington
(74) *Attorney, Agent, or Firm* — Oliff & Berridge, PLC

(57) ABSTRACT

Both an end surface of a first rib, over which a first cylindrical rollers slide, and an end surface of a second rib, over which the first cylindrical rollers slide, slope to approach the perpendicular bisector plane of a first cylindrical raceway surface of an outer ring or slope to be spaced away from the perpendicular bisector plane as it goes outward in a radial direction in a cross section of the outer ring taken in an axial direction. A first sliding contact portion of each first cylindrical roller, which is in sliding contact with the end surface of the first rib, and a second sliding contact portion of each first cylindrical roller, which is in sliding contact with the end surface of the second rib, both are located inward in the radial direction with respect to an orbital cylindrical plane of the first cylindrical rollers.

16 Claims, 2 Drawing Sheets

ROLLING BEARING

INCORPORATION BY REFERENCE

The disclosure of Japanese Patent Application No. 2008-328025 filed on Dec. 24, 2008 including the specification, drawings and abstract is incorporated herein by reference in its entirety.

BACKGROUND OF THE INVENTION

1. Field of the Invention

The invention relates to a rolling bearing and, more particularly, to a rolling bearing that is suitable when used in a drive roll or driven roll of a continuous casting machine.

2. Description of the Related Art

In an existing art, a rolling bearing includes a cylindrical roller bearing that is described in Japanese Utility Model Application Publication No. 63-142419 (JP-U-63-142419) (FIG. 3). A rolling bearing unit includes a shaft member, a housing member, a loose rib and a snap ring, and the cylindrical roller bearing is arranged on the shaft member. The cylindrical roller bearing includes an aligning ring, an outer ring, an inner ring and a plurality of cylindrical rollers. The aligning ring has an inner surface formed of part of a spherical surface. The outer ring has an outer surface formed of part of a spherical surface.

The aligning ring is fixed onto an inner peripheral surface of the housing member. The outer surface of the outer ring is fitted to the inner surface of the aligning ring. The outer ring has ribs respectively on one side and the other side of a raceway surface.

On the other hand, the inner ring is fixedly fitted around an outer peripheral surface of the shaft member. One end surface of the inner ring in the axial direction is in contact with a step of the shaft member.

The inner ring has a rib on one side of a raceway surface in the axial direction. The snap ring is fitted in an annular groove of the shaft member. In addition, the loose rib is fixedly fitted around the shaft member. The loose rib is axially held by the other end surface of the inner ring in the axial direction and the snap ring. In addition, the plurality of cylindrical rollers are arranged between the raceway surface of the outer ring and the raceway surface of the inner ring so that they do not overlap one another in the axial direction.

When an axial load acts on the rolling bearing unit, the rolling bearing unit transmits force in order of the step of the shaft member, the rib at one side of the inner ring, the cylindrical rollers, the rib of the outer ring at the other side in the axial direction, the aligning ring and the housing member to receive the axial load, or adds force in order of the snap ring, the loose rib, the cylindrical rollers, the rib of the outer ring at one side in the axial direction, the aligning ring and the housing member to receive the axial load.

In the rolling bearing unit, an axial load is withstood by sliding contact between the end surfaces of the rolling cylindrical rollers and the rib or loose rib. Thus, particularly, under the specifications of extremely low rotational speeds as in the case used in a continuous casting machine, it is difficult to form an oil film. Then, as a result, in the cylindrical roller bearing, metal contact occurs between the end surfaces of the cylindrical rollers and the rib. This may produce galling on the end surfaces of the cylindrical rollers or the rib.

In addition, particularly, in the case where the cylindrical roller bearing is a full complement roller bearing that has no retainer, when the roller bearing receives an axial load and then rollers are about to fall down, the rib contacts with the end surfaces of the rollers at their edges to thereby locally increase contact pressure. This may produce galling on the end surfaces of the cylindrical rollers or the rib.

SUMMARY OF THE INVENTION

The invention provides a rolling bearing that is less likely to produce galling on a rib and end surfaces of rollers.

A first aspect of the invention provides a rolling bearing. The rolling bearing includes: a first raceway member that has a first raceway surface and a first rib located on one side of the first raceway surface in an axial direction; a second raceway member that has a second raceway surface and a second rib located on the other side of the second raceway surface in the axial direction; and a first rolling element that is arranged between the first raceway surface and the second raceway surface, wherein both a first guide face of the first rib, over which the first rolling element slides, and a second guide face of the second rib, over which the first rolling element slides, slope to approach a perpendicular bisector plane of the first raceway surface or slope to be spaced away from the perpendicular bisector plane as it goes outward in a radial direction in a cross section of the first raceway member taken in the axial direction, and a first sliding contact portion of the first rolling element, which is in sliding contact with the first guide face, and a second sliding contact portion of the first rolling element, which is in sliding contact with the second guide face, are located on the same side in the radial direction with respect to an orbital annular plane of the first rolling element.

With the first aspect, both the first and second guide faces of the ribs located on both sides of the first rolling element slope to approach the perpendicular bisector plane of the first raceway surface or slope to be spaced away from the perpendicular bisector plane as it goes outward in the radial direction in the cross section, and both the first sliding contact portion and the second sliding contact portion are located on the same side in the radial direction with respect to the orbital annular plane of the first rolling element. Thus, the first rolling element receives force in the radial direction from the above same side with respect to the orbital annular plane toward an opposite side thereof by the sum of normal force received from the first and second guide faces.

That is, the first rolling element may be constantly pressed toward the first raceway member or the second raceway member in the radial direction, so it is possible to suppress inclination of the first rolling element. This can suppress edge contact of the first rolling element with the first guide face or the second guide face. Thus, it is possible to prevent occurrence of galling on the end surface of the rib or the end surface of the roller.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described in detail with reference to the accompanying drawings.

Note that, in the following first embodiment and second embodiment, the divergent shape of a rib, the taper shape of a rib, the slope of a guide face of a rib and part of a spherical surface of an end surface including a sliding portion of each cylindrical roller in the following detailed description are exaggerated for easy understanding.

Note that in this specification, a raceway surface is defined as a portion of a raceway member, with which a rolling surface of a rolling element may contact. In addition, in this specification, a guide face is defined as a portion of a rib, on which a rolling element may contact (slide).

In addition, an orbital annular plane is defined as a locus drawn by a central axis of a rolling element (a cylindrical roller, a tapered roller, or a convex roller) when the rolling element orbits.

Figure 1:
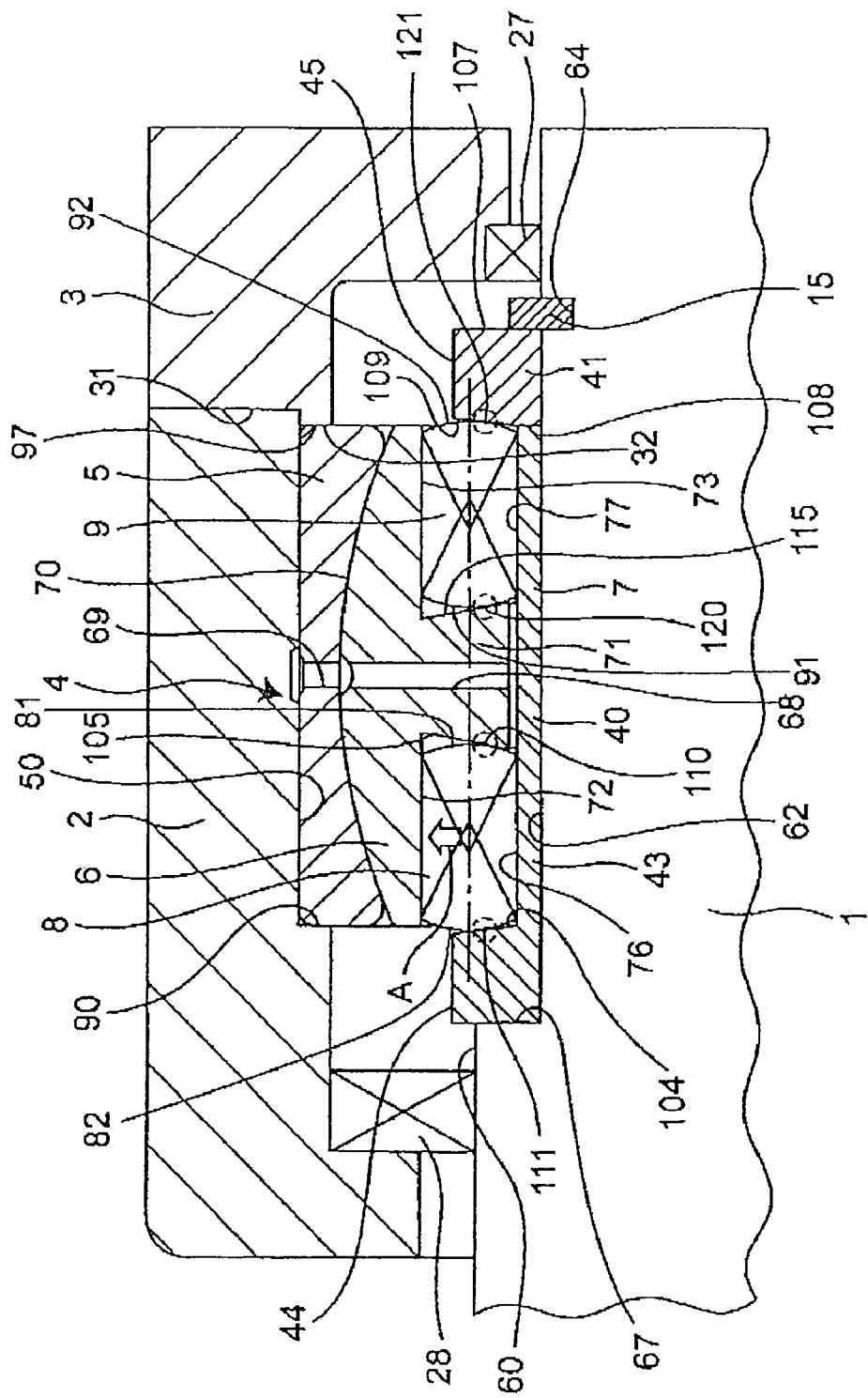
FIG. 1 is an enlarged schematic view of a roll neck portion in a driven roll unit according to a first embodiment of the invention.

FIG. 1 is an enlarged schematic view of a roll neck portion in a driven roll unit of a continuous casting machine according to the first embodiment of the invention.

The driven roll unit includes a roll 1, a journal box 2, a cap 3, a double row cylindrical roller bearing 4 that serves as a rolling bearing, and a C-shape snap ring 15 that is an example of a snap ring. The journal box 2 and the cap 3 constitute a housing member.

The roll 1 has a first cylindrical outer peripheral surface 60 and a second cylindrical outer peripheral surface 62. The outside diameter of the first cylindrical outer peripheral surface 60 is larger than the outside diameter of the second cylindrical outer peripheral surface 62. The first cylindrical outer peripheral surface 60 is continuous with the second cylindrical outer peripheral surface 62 via a step 67 that extends radially. The roll 1 hag an annular snap ring fitting groove 64. The snap ring fitting groove 64 extends in the circumferential direction of the roll 1. Both one end and the other end of the snap ring fitting groove 64 in the axial direction are continuous with the second cylindrical outer peripheral surface 62.

The journal box 2 is fixed to a segment (not shown) of the continuous casting machine. The cap 3 is fixed to the journal box 2. The housing member has an annular, substantially cylindrical aligning ring fitting groove 50 on its inner periphery. The journal box 2 has a step 90 that protrudes radially from the inner peripheral surface thereof. The step 90 constitutes a side surface of the aligning ring fitting groove 50, opposite to the cap 3 side in the axial direction. On the other hand, an end surface of the cap 3 adjacent to the journal box 2 has an outer side end surface 31 and an axial protruding portion 32. The outer side end surface 31 faces an end surface of the journal box 2 in the axial direction, and is in contact with the end surface of the journal box 2. In addition, the axial protruding portion 32 is located on the inner side of the outer side end surface 31 in the radially direction. The axial protruding portion 32 protrudes from the outer side end surface 31 in the axial direction. The axial protruding portion 32 has a cylindrical outer peripheral surface and an end surface 97. The cylindrical outer peripheral surface is continuous with the outer side end surface 31 via a corner. In addition, the end surface 97 is located at the distal end of the axial protruding portion 32.

The double row cylindrical roller bearing 4 includes an aligning ring 5, an outer ring 6, an inner ring 7, a plurality of first cylindrical rollers 8 and a plurality of second cylindrical rollers 9. The outer ring 6 constitutes a first raceway member. The inner ring 7 constitutes a second raceway member. In addition, the first cylindrical rollers 8 constitute first rolling elements. The second cylindrical rollers 9 constitute second rolling elements.

The aligning ring 5 has a cylindrical outer peripheral surface and a spherical inner peripheral surface. The cylindrical outer peripheral surface of the aligning ring 5 is fixedly fitted in the aligning ring fitting groove 50 that is a journal box inner surface. The cylindrical outer peripheral surface of the axial protruding portion 32 is fitted in a cylindrical inner peripheral surface of the journal box 2. In addition, the end surface 97 of the axial protruding portion 32 is in contact with the cap 3 side end surface of the aligning ring 5. The aligning ring 5 is axially held between the step 90 and the end surface 97 of the axial protruding portion 32 to position the aligning ring 5 with respect to the housing member. The aligning ring 5 is not movable with respect to the housing member.

The outer ring 6 has a spherical outer peripheral surface 70, a first rib 71, a first cylindrical raceway surface 72 that serves as a first raceway surface and a third cylindrical raceway surface 73 that serves as a third raceway surface. The spherical outer peripheral surface of the outer ring 6 is fitted onto the spherical inner peripheral surface of the aligning ring 5. When the roll 1 is inclined with respect to the journal box 2 because of an installation error of the roll 1 or a load on the roll 1 during usage, aligning is carried out between the spherical inner peripheral surface of the aligning ring 5 and the spherical outer peripheral surface of the outer ring 6.

The first rib 71 protrudes radially inward from the center of the inner peripheral surface of the outer ring 6. The third cylindrical raceway surface 73 is located at one end (right end in the sheet of FIG. 1) of the inner peripheral surface of the outer ring 6. The first cylindrical raceway surface 72 is located at the other end of the inner peripheral surface of the outer ring 6. The first rib 71 is located on one side of the first cylindrical raceway surface 72 in the axial direction. The first rib 71 is located on the other side of the third cylindrical raceway surface 73 in the axial direction. The outer ring 6 has a shape that is substantially plane-symmetrical with respect to the perpendicular bisector plane of the spherical outer peripheral surface 70.

The cross section of the first rib 71 taken in the axial direction has a divergent shape toward radially inward. In the first embodiment, in the cross section taken in the axial direction, a distance in the axial direction between the end surface of the first rib 71 adjacent to the first cylindrical raceway surface 72 in the axial direction and the perpendicular bisector plane of the first cylindrical raceway surface 72 linearly (linear functionally) reduces as it goes radially inward. In addition, in the cross section taken in the axial direction, a distance in the axial direction between the end surface of the first rib 71 adjacent to the third cylindrical raceway surface 73 in the axial direction and the perpendicular bisector plane of the third cylindrical raceway surface 73 linearly (linear functionally) reduces as it goes radially inward.

The inner ring 7 is fixedly fitted around the second cylindrical outer peripheral surface 62 of the roll 1. The inner ring 7 has an annular first member 40 and an annular second member 41. The first member 40 has a cylindrical portion 43 and a second rib 44. The second rib 44 is located on the other side of the cylindrical portion 43 in the axial direction. The cylindrical portion 43 has a cylindrical outer peripheral surface. On the cylindrical outer peripheral surface, a second cylindrical raceway surface 76 that serves as a second raceway surface is located at a portion that is axially spaced away from the distal end surface of the first rib 71 of the outer ring 6 on the other side in the axial direction. On the other hand, on the cylindrical outer peripheral surface, a fourth cylindrical raceway surface 77 that serves as a fourth raceway surface is located at a portion that is axially spaced away from the distal end surface of the first rib 71 on the one side in the axial direction.

An end surface 104 of the second rib 44, adjacent to the first rib 71 of the outer ring 6, and an end surface 105 of the first rib 71 adjacent to the second rib 44, are substantially plane-symmetrical with respect to the perpendicular bisector plane of the second cylindrical raceway surface 76 of the inner ring 7. In the cross section taken in the axial direction, a distance between the end surface 104 of the second rib 44 and the perpendicular bisector plane of the second cylindrical raceway surface 76 of the inner ring 7 reduces as it goes radially inward.

The second member 41 has a first end surface 107, a second end surface 108 and a third end surface 109. The first end surface 107 is located at one side in the axial direction, while the second and third end surfaces 108 and 109 are located at the other side in the axial direction (at an inner side in the axial direction). The first and second end surfaces 107 and 108 extend substantially in the radial direction. On the other hand, the third end surface 109 is inclined with respect to the radial direction.

The second end surface 108 is in contact with an end surface of the first member 40 adjacent to the second member 41 in the axial direction. In addition, the third end surface 109 extends from the radially outer end of the second end surface 108. In the cross section taken in the axial direction, the third end surface 109 substantially linearly (substantially linear functionally) slopes toward one side in the axial direction (toward an outer side in the axial direction) as it goes radially outward.

As shown in FIG. 1, the end surface 104 of the second rib 44 of the first member 40 and the third end surface 109 are substantially plane-symmetrical with respect to the perpendicular bisector plane of the outer ring 6. In the second member 41, a portion 45 located radially outward beyond the cylindrical portion 43 constitutes a third rib of the second raceway member.

The plurality of first cylindrical rollers 8 are circumferentially arranged between the first cylindrical raceway surface 72 of the outer ring 6 and the second cylindrical raceway surface 76 of the inner ring 7. Each of the first cylindrical rollers 8 has a first end surface 81 at one side in the axial direction. The first end surface 81 is in sliding contact with the end surface 105 at the other side of the first rib 71 of the outer ring 6 in the axial direction. On the other hand, each of the first cylindrical rollers 8 has a second end surface 82 at the other side in the axial direction. The second end surface 82 is in sliding contact with the end surface 104 of the second rib 44. The end surface 104 of the second rib 44 at one side in the axial direction constitutes a second guide face of the inner ring 7. The end surface 105 of the first rib 71 at the other side in the axial direction constitutes a first guide face of the outer ring 6.

In addition, a first sliding contact portion 110 of each first cylindrical roller 8 is in sliding contact with the end surface 105 of the outer ring 6. A second sliding contact portion 111 of each first cylindrical roller 8 is in sliding contact with the end surface 104 of the inner ring 7. The first sliding contact portion 110 and the second sliding contact portion 111 are located radially inward, that is, on the same side in the radial direction, with respect to an orbital cylindrical plane of the first cylindrical rollers 8 (cylindrical plane drawn by the central axes of the first cylindrical rollers 8 when the first cylindrical rollers 8 orbit). The positions of the first sliding contact portions 110 in the radial direction substantially coincide with the positions of the second sliding contact portions 111 in the radial direction. The orbital cylindrical plane is an example of the orbital annular plane.

Although not described in detail, in the cross section taken in the axial direction, the first end surface 81 and second end surface 82 of each first cylindrical roller 8 each have a circular arc shape having the same radius with the center located on the center line of the first cylindrical roller 8 in the radial direction, and are respectively parts of different spherical surfaces. The center of curvature of each first end surface 81 is located on the other side (adjacent to the second sliding contact portion) of the corresponding first cylindrical roller 8 in the axial direction beyond the center of that first cylindrical roller 8 in the axial direction. On the other hand, the center of curvature of each second end surface 82 is located on one side (adjacent to the first sliding contact portion) of the corresponding first cylindrical roller 8 in the axial direction beyond the center of that first cylindrical roller 8 in the axial direction.

In this way, the length of each first cylindrical roller 8 in the axial direction when the central axis of the first cylindrical roller 8 is inclined with respect to the axial direction is larger than the length of the first cylindrical roller 8 in the axial direction when the central axis of the first cylindrical roller 8 is parallel to the axial direction. In this way, when an axial load acts on each first cylindrical roller 8, the central axis of the first cylindrical roller 8 is hard to be inclined with respect to the axial direction.

The plurality of second cylindrical rollers 9 are circumferentially arranged between the third cylindrical raceway surface 73 of the outer ring 6 and the fourth cylindrical raceway surface 77 of the inner ring 7. Each of the second cylindrical rollers 9 has a fourth end surface 92 at one side in the axial direction. The fourth end surface 92 is in sliding contact with the third end surface 109 of the second member 41 of the inner ring 7. On the other hand, each of the second cylindrical rollers 9 has a third end surface 91 at the other side in the axial direction. The third end surface 91 is in sliding contact with an end surface 115 at one side of the first rib 71 of the outer ring 6 in the axial direction. The third end surface 109 of the second member 41 of the inner ring 7 constitutes a fourth guide face of the inner ring 7. The end surface 115 at one side of the first rib 71 of the outer ring 6 in the axial direction constitutes a third guide face of the outer ring 6.

In addition, a third sliding contact portion 120 of each second cylindrical roller 9 is in sliding contact with the end surface 115 of the outer ring 6. A fourth sliding contact portion 121 of each second cylindrical roller 9 is in sliding contact with the third end surface 109 of the inner ring 7. The third sliding contact portion 120 and the fourth sliding contact portion 121 are located radially inward, that is, on the same side in the radial direction, with respect to an orbital cylindrical plane of the second cylindrical rollers 9 (cylindrical plane drawn by the central axes of the second cylindrical rollers 9 when the second cylindrical rollers 9 orbit). The positions of the third sliding contact portions 120 in the radial direction substantially coincide with the positions of the fourth sliding contact portions 121 in the radial direction. The orbital cylindrical plane is an example of the orbital annular plane.

Although not described in detail, in the cross section taken in the axial direction, the third end surface 91 and fourth end surface 92 of each second cylindrical roller 9 each have a circular arc shape having the same radius with the center located in the center line of the cylindrical roller 9 in the radial direction, and are respectively parts of different spherical surfaces. The center of curvature of each fourth end surface 92 is located on the other side (adjacent to the third sliding contact portion) of the corresponding second cylindrical roller 9 in the axial direction beyond the center of that second cylindrical roller 9 in the axial direction. On the other hand, the center of curvature of each third end surface 91 is located on one side (adjacent to the fourth sliding contact portion) of the corresponding second cylindrical roller 9 in the axial direction beyond the center of that second cylindrical roller 9 in the axial direction.

In this way, the length of each second cylindrical roller 9 in the axial direction when the central axis of the second cylindrical roller 9 is inclined with respect to the axial direction is larger than the length of the second cylindrical roller 9 in the axial direction when the central axis of the second cylindrical roller 9 is parallel to the axial direction. In this way, when an axial load acts on each second cylindrical roller 9, the central axis of the second cylindrical roller 9 is hard to be inclined with respect to the axial direction.

The C-shape snap ring 15 is fitted in the snap ring fitting groove 64. An end surface of the C-shape snap ring 15 adjacent to the first rib 71 is in contact with the first end surface 107 of the second member 41. In addition, in the first member 40 of the inner ring 7, an end surface opposite to the second member 41 side in the axial direction is in contact with the step 67 of the roll 1.

Although not shown in detail, 27 and 28 are seal members. Each of the seal members 27 and 28 is fixed to the cap 3 or the journal box 2, while they are slidable over the roll 1 in the axial direction. The seal member 27 seals a gap between the cap 3 and the roll 1 on one side of the cylindrical rollers 8 in the axial direction. The seal member 28 seals a gap between the journal box 2 and the roll 1 on the other side of the cylindrical rollers 8 in the axial direction.

Although not described in detail, 68 is a lubricant supply hole that radially extends through the outer ring 6, and 69 is a lubricant supply hole that radially extends through the aligning ring 5. The lubricant supply hole 68 of the outer ring 6 is open to a peripheral groove of the outer ring 6, formed in the circumferential direction on the outer peripheral surface of the outer ring 6. The lubricant supply hole 68 is in fluid communication with the lubricant supply hole 69 of the aligning ring 5 via the peripheral groove of the outer ring 6.

An end of the lubricant supply hole 69 of the aligning ring 5, opposite to the outer ring 6 side, is open to a peripheral groove of the aligning ring fitting groove 50 of the journal box inner surface formed on the inner peripheral surface of the journal box. The lubricant supply hole 69 of the aligning ring 5 is in fluid communication with a lubricant supply passage of the housing member (not shown) via the peripheral groove of the aligning ring fitting groove 50. The lubricant supply passage extends through the housing member. Lubricant is poured from an opening of the lubricant supply passage, opposite to the lubricant supply hole 69 side. The poured lubricant flows through the lubricant supply passage, the lubricant supply hole 69 and the lubricant supply hole 68 in the stated order into the double row cylindrical roller bearing 4.

In the above configuration, when the driven roll unit receives an axial load from the left side of the roll 1 toward the right side thereof on the sheet of FIG. 1, the driven roll unit transfers the axial load from the step 67 of the roll 1 via the second rib 44 of the first member 40, the first cylindrical rollers 8, the first rib 71 of the outer ring 6 and the aligning ring 5 to the end surface 97 of the axial protruding portion 82 of the cap 3, and then the axial load is withstood by the roll 1 and the housing member.

In addition, when the driven roll unit receives an axial load from the right side of the roll 1 toward the left side thereof on the sheet of FIG. 1, the driven roll unit transfers the axial load from the roll 1 via the C-shape snap ring 15, the second member 41, the second cylindrical rollers 9, the first rib 71 of the outer ring 6 and the aligning ring 5 to the step 90 of the journal box 2, and then the axial load is withstood by the roll 1 and the housing member.

With the double row cylindrical roller bearing 4 according to the first embodiment, both the first guide face (end surface 105) and the second guide face (end surface 104) of the ribs (the first rib 71 and the second rib 44) located on both sides of the first cylindrical rollers 8 in the axial direction are inclined to approach the perpendicular bisector plane of the first cylindrical raceway surface 72 of the outer ring 6 as it goes radially inward in the cross section taken in the axial direction, and, in addition, both the first sliding contact portion 110 and the second sliding contact portion 111 of each first cylindrical roller 8 are located radially inward, that is, on the same side in the radial direction, with respect to the orbital cylindrical plane of the first cylindrical rollers 8. Thus, as the double row cylindrical roller bearing 4 withstands an axial load, the first cylindrical rollers 8 receive force directed radially outward as indicated by the arrow A in FIG. 1 by the sum of normal force received from the first guide face (part of the end surface 105) and the second guide face (part of the end surface 104). That is, the first cylindrical rollers 8 may be constantly pressed toward the outer ring 6 side, so it is possible to suppress inclination of the first cylindrical rollers 8. This can suppress edge contact of the first cylindrical rollers 8 with the first guide face (part of the end surface 105) and the second guide face (part of the end surface 104). Thus, it is possible to suppress occurrence of galling on the first or second guide face or on the end surfaces of the first cylindrical rollers 8.

In addition, with the double row cylindrical roller bearing 4 according to the first embodiment, the positions of the first sliding contact portions 110 in the radial direction substantially coincide with the positions of the second sliding contact portions 111 in the radial direction. Thus, the resultant force of a force acting on the first cylindrical rollers 8 from one side in the axial direction and a force acting on the first cylindrical rollers 8 from the other side in the axial direction may be approximated to a radial force. Thus, it is possible to further suppress inclination of the first cylindrical rollers 8.

In addition, with the double row cylindrical roller bearings 4 according to the first embodiment, the end surface 105 of the first rib 71 of the outer ring 6 and the end surface 104 of the second rib 44 of the inner ring 7 are substantially plane-symmetrical with respect to the perpendicular bisector plane of the first cylindrical raceway surface 72 of the outer ring 6. Thus, the resultant force of a force acting on the first cylindrical rollers 8 from one side in the axial direction and a force acting on the first cylindrical rollers 8 from the other side in the axial direction may be substantially accurately made as a radial force. Therefore, it is possible to considerably suppress inclination of the first cylindrical rollers 8.

In addition, with the double row cylindrical roller bearing 4 according to the first embodiment, the first cylindrical rollers 8 and the second cylindrical rollers 9 are axially arranged in a double row. Thus, it is possible to withstand both an axial load from one side toward the other side in the axial direction and an axial load from the other side toward one side in the axial direction.

In addition, with the double row cylindrical roller bearing 4 according to the first embodiment, the first cylindrical rollers 8 and the second cylindrical rollers 9 are respectively pressed by the first and third cylindrical raceway surfaces 72 and 73, which are the inner peripheral raceway surfaces of the outer ring 6, and the first cylindrical rollers 8 and the second cylindrical rollers 9 are respectively pressed by concave surfaces. Thus, the positions of the first cylindrical rollers 8 and second cylindrical rollers 9 may be corrected as they are pressed. Therefore, from this point as well, the behavior of the first and second cylindrical rollers 8 and 9 becomes stable, and it is possible to prevent occurrence of galling on the first guide face (end surface 105), the second guide face (end surface 104), the third guide face (end surface 115), the fourth guide face (end surface 109), the end surfaces (the first end surfaces 81 and the second end surfaces 82) of the first cylindrical rollers 8 and the end surfaces (the third end surfaces 91 and the fourth end surfaces 92) of the second cylindrical rollers 9.

Note that in the double row cylindrical roller bearing 4 according to the first embodiment, the inner ring 7 is formed of the first member 40 and the second member 41 that serves as a loose rib, and the third rib located on one side of the inner ring in the axial direction is formed of part of the loose rib. Instead, in the aspect of the invention, the inner ring may be formed of three members, specifically, a body portion that has a raceway surface, a first loose rib located on one side of the body portion in the axial direction and a second loose rib located on the other side of the body portion in the axial direction. In addition, in the aspect of the invention, the inner ring may be a one-piece inner ring that has a raceway surface and two ribs located respectively on one side and the other side of the raceway surface.

In addition, in the rolling bearing unit according to the first embodiment, the aligning ring 5 is fitted into the journal box 2, and, in addition, the spherical outer peripheral surface of the outer ring 6 is fitted onto the spherical inner peripheral surface of the aligning ring 5. Instead, the rolling bearing unit according to the aspect of the invention may be configured so that no aligning ring is provided and the outer peripheral surface of the outer ring is directly fitted onto the inner peripheral surface of the housing member.

In addition, in the double row cylindrical roller bearing 4 according to the first embodiment, the rolling elements (the first cylindrical rollers 8 and the second cylindrical rollers 9) are arranged in a double row. Instead, in the aspect of the invention, the rolling elements may be arranged in a single row (in series).

In addition, in the double row cylindrical roller bearing 4 according to the first embodiment, the guide faces (end surfaces 104, 105, 115 and 109) of the ribs that guide the end surfaces of the cylindrical rollers 8 and 9 have a straight shape in cross section taken in the axial direction. In the aspect of the invention, the guide faces of the ribs that guide the end surfaces of the cylindrical rollers may have a curved shape or may have a shape that includes a curved shape and a straight shape in the cross section taken in the axial direction.

In addition, in the double row cylindrical roller bearing 4 according to the first embodiment, the shapes of the guide faces 104 and 105 located respectively on both sides of the cylindrical rollers 8 and the shapes of the guide faces 109 and 115 located respectively on both sides of the cylindrical rollers 9 are substantially plane-symmetrical with respect to the respective perpendicular bisector planes of the cylindrical raceway surfaces 76 and 77 of the inner ring 40, on which the respective cylindrical rollers 8 and 9 roll. In the aspect of the invention, the shapes of the guide faces located respectively on both side of the cylindrical rollers may not be plane-symmetrical with respect to the perpendicular bisector plane of the raceway surface of the inner ring on which the cylindrical rollers roll. For example, in the cross section taken in the axial direction, the inclinations of the guide faces located respectively on both sides of the cylindrical rollers may be not laterally symmetrical but laterally different.

In addition, in the double row cylindrical roller bearing 4 according to the first embodiment, the positions of the first sliding contact portions 110 of the cylindrical rollers 8 in the radial direction substantially coincide with the positions of the second sliding contact portions 111 of the cylindrical rollers 8 in the radial direction. In the aspect of the invention, the positions of the first sliding contact portions of the cylindrical rollers in the radial direction may be different from the positions of the second sliding contact portions of the cylindrical rollers in the radial direction.

In addition, in the double row cylindrical roller bearing according to the first embodiment, in each of the cylindrical rollers 9, the position of the third sliding contact portion 120 in the radial direction substantially coincides with the position of the fourth sliding contact portion 121 in the radial direction. In the aspect of the invention, the position of the third sliding contact portion of each cylindrical roller in the radial direction may be different from the position of the fourth sliding contact portion in the radial direction.

In addition, in the double row cylindrical roller bearing 4 according to the first embodiment, the outer ring 6 has the first rib 71 that divergently protrudes radially inward from the center of the inner peripheral surface of the outer ring 6 as it goes radially inward, while the inner ring 7 has the second rib 44 and the third rib 45 that protrude radially outward from both ends in the axial direction so that the guide faces slope outward in the axial direction as they go radially outward. However, in the aspect of the invention, it is also applicable that the outer ring has a second rib and a third rib that protrude radially inward from both ends in the axial direction so that the guide faces slope inward in the axial direction as they go radially inward, while the inner ring has a first rib that taperingly protrudes radially outward from the center of the outer peripheral surface of the inner ring as it goes radially outward.

In addition, in the double row cylindrical roller bearing 4 according to the first embodiment, the outer ring 6 has the first rib 71 that protrudes radially inward from the center of the inner peripheral surface of the outer ring 6 so as to be divergent as it goes radially inward, while the inner ring 7 has the second rib 44 and the third rib 45 that protrude radially outward from both ends in the axial direction so that the guide faces are inclined outward in the axial direction as they go radially outward. However, in the aspect of the invention, it is also applicable that the outer ring has a first rib that protrudes radially inward from the center of the inner peripheral surface of the outer ring so as to taper as it goes radially inward, while the inner ring has a second rib and a third rib that protrude radially outward from both ends in the axial direction so that the guide faces slope inward in the axial direction as they go radially outward. Next, the double row cylindrical roller bearing will be described.

Figure 2:
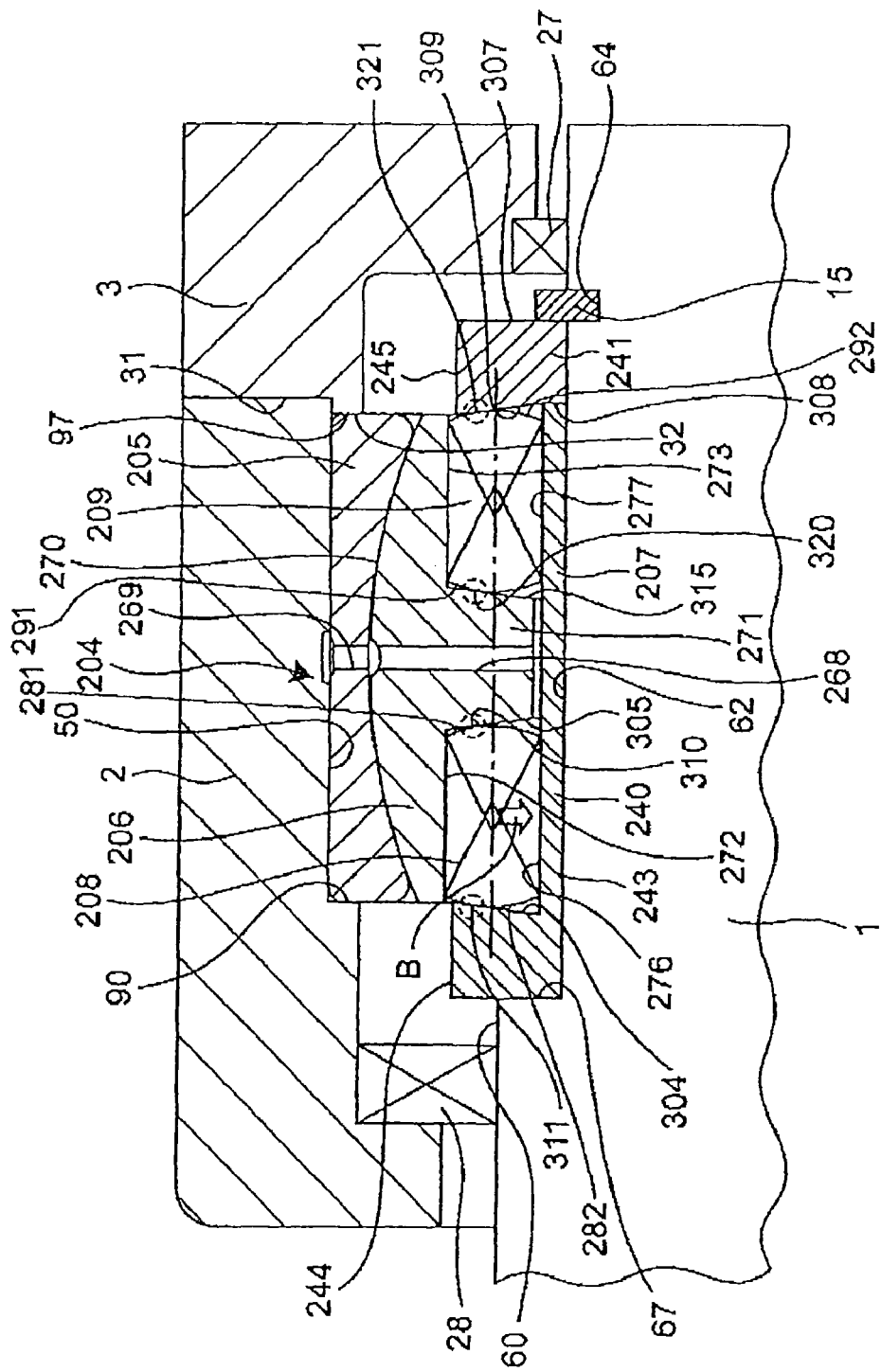
FIG. 2 is an enlarged schematic view of a roll neck portion in a driven roll unit according to a second embodiment of the invention.

FIG. 2 is a cross-sectional view of a driven roll unit taken in the axial direction according to the second embodiment.

In the second embodiment, like reference numerals denote similar components to those of the first embodiment, and the description thereof is omitted. In addition, in the second embodiment, the description of the same functions and advantageous effects and alternative embodiments as those of the first embodiment is omitted, and only the configuration, functions, advantageous effects and alternative embodiments different from those of the first embodiment will be described.

The driven roll unit includes a double row cylindrical roller bearing 204. The double row cylindrical roller bearing 204 includes an aligning ring 205, an outer ring 206, an inner ring 207, a plurality of first cylindrical rollers 208 and a plurality of second cylindrical rollers 209.

The outer ring 206 constitutes a first raceway member. The inner ring 207 constitutes a second raceway member. In addition, the first cylindrical rollers 208 constitute first rolling elements. The second cylindrical rollers 209 constitute second rolling elements.

The aligning ring 205 has a cylindrical outer peripheral surface and a spherical inner peripheral surface. The cylindrical outer peripheral surface of the aligning ring 205 is fixedly fitted in an aligning ring fitting groove 50 that is a journal box inner surface. The cylindrical outer peripheral surface of the axial protruding portion 32 is fitted onto the inner peripheral surface of the journal box 2. The end surface 97 of the axial protruding portion 32 is in contact with the cap 3 side end surface of the aligning ring 205. The aligning ring 205 is axially held between the step 90 and the end surface 97 of the axial protruding portion 32 to position the aligning ring 205 with respect to a housing member. The aligning ring 205 is not movable with respect to the housing member.

The outer ring 206 has a spherical outer peripheral surface 270, a first rib 271, a first cylindrical raceway surface 272 that serves as a first raceway surface and a third cylindrical raceway surface 273 that serves as a third raceway surface. The spherical outer peripheral surface of the outer ring 206 is fitted onto the spherical inner peripheral surface of the aligning ring 205. When the roll 1 is inclined with respect to the journal box 2 because of an installation error of the roll 1 or a load on the roll 1 during usage, aligning is carried out between the spherical inner peripheral surface of the aligning ring 205 and the spherical outer peripheral surface of the outer ring 206.

The first rib 271 protrudes radially inward from the center of the inner peripheral surface of the outer ring 206. The third cylindrical raceway surface 273 is located at one side of the inner peripheral surface of the outer ring 206 in the axial direction. The first cylindrical raceway surface 272 is located at the other end of the inner peripheral surface of the outer ring 206. The first rib 271 is located on one side of the first cylindrical raceway surface 272 in the axial direction. The first rib 271 is located on the other side of the third cylindrical raceway surface 273 in the axial direction. The outer ring 206 has a shape that is substantially plane-symmetrical with respect to the perpendicular bisector plane of the spherical outer peripheral surface 270.

The cross section of the first rib 271, taken in the axial direction, tapers

The cross section of the first rib 271, taken in the axial direction, tapers toward radially inward. In the second embodiment, in the above cross section, a distance in the axial direction between the end surface of the first rib 271 adjacent to the first cylindrical raceway surface 272 and the perpendicular bisector plane of the first cylindrical raceway surface 272 linearly (linear functionally) increases as it goes radially inward. In addition, in the cross section taken in the axial direction, a distance in the axial direction between the end surface of the first rib 271 adjacent to the third cylindrical raceway surface 273 and the perpendicular bisector plane of the third cylindrical raceway surface 273 linearly (linear functionally) increases as it goes radially inward.

The inner ring 207 is fixedly fitted around the second cylindrical outer peripheral surface 62 of the roll 1. The inner ring 207 has an annular first member 240 and an annular second member 241. The first member 240 has a cylindrical portion 243 and a second rib 244. The second rib 244 is located on the other side of the cylindrical portion 243 in the axial direction. The cylindrical portion 243 has a cylindrical outer peripheral surface. On the cylindrical outer peripheral surface, a second cylindrical raceway surface 276 that serves as a second raceway surface is located at a portion that is axially spaced away from the distal end surface of the first rib 271 of the outer ring 206 on the other side in the axial direction. On the other hand, on the cylindrical outer peripheral surface, a fourth cylindrical raceway surface 277 that serves as a fourth raceway surface is located at a portion that is axially spaced away from the distal end surface of the first rib 271 on the one side in the axial direction.

An end surface 304 of the second rib 244, adjacent to the first rib 271, and an end surface 305 of the first rib 271 of the outer ring 206, adjacent to the second rib 244, are substantially plane-symmetrical with respect to the perpendicular bisector plane of the second cylindrical raceway surface 276 of the inner ring 207. In the cross section taken in the axial direction, a distance between the end surface 304 of the second rib 244 and the perpendicular bisector plane of the second cylindrical raceway surface 276 of the inner ring 207 increases as it goes radially inward.

The second member 241 has a first end surface 307, a second end surface 308 and a third end surface 309. The first end surface 307 is located at one side in the axial direction, while the second and third end surfaces 308 and 309 are located at the other side in the axial direction (at an inner side in the axial direction). The first and second end surfaces 307 and 308 extend substantially in the radial direction. On the other hand, the third end surface 309 is inclined with respect to the radial direction.

The second end surface 308 is in contact with an end surface of the first member 240 adjacent to the second member 241 in the axial direction. In addition, the third end surface 309 extends from a radially outer side of the second end surface 308. In the cross section taken in the axial direction, the third end surface 309 substantially linearly (substantially linear functionally) slopes toward the other side in the axial direction (toward an inner side in the axial direction) as it goes radially outward.

As shown in FIG. 2, the end surface 304 of the second rib 244 of the first member 240 and the third end surface 309 are substantially plane-symmetrical with respect to the perpendicular bisector plane of the outer ring 206. In the second member 241, a portion 245 located radially outward beyond the cylindrical portion 243 constitutes a third rib of the second raceway member.

The plurality of first cylindrical rollers 208 are circumferentially arranged between the first cylindrical raceway surface 272 of the outer ring 206 and the second cylindrical raceway surface 276 of the inner ring 207.

Each of the first cylindrical rollers 208 has a first end surface 281 at one side in the axial direction. The first end surface 281 is in sliding contact with the end surface 305 at the other side of the first rib 271 of the outer ring 206 in the axial direction. On the other hand, each of the first cylindrical rollers 208 has a second end surface 282 at the other side in the axial direction. The second end surface 282 is in sliding contact with the end surface 304 of the second rib 244. The end surface 304 of the second rib 244 at one side in the axial direction constitutes a second guide face of the inner ring 207. The end surface 305 of the first rib 271 at the other side in the axial direction constitutes a first guide face of the outer ring 206.

In addition, a first sliding contact portion 310 of each first cylindrical roller 208 is in sliding contact with the end surface 305 of the outer ring 206. A second sliding contact portion 311 of each first cylindrical roller 208 is in sliding contact with the end surface 304 of the inner ring 207. The first sliding contact portion 310 and the second sliding contact portion 311 are located radially outward, that is, on the same side in the radial direction, with respect to an orbital cylindrical plane of the first cylindrical rollers 208. The positions of the first sliding contact portions 310 in the radial direction substantially coincide with the positions of the second sliding contact portions 311 in the radial direction.

Although not described in detail, in the cross section taken in the axial direction, the first end surface 281 and second end surface 282 of each first cylindrical roller 208 each have a circular arc shape having the same radius with the center located on the center line of the first cylindrical roller 208 in the radial direction, and are respectively parts of different spherical surfaces. The center of curvature of each first end surface 281 is located on the other side (adjacent to the second sliding contact portion) of the corresponding first cylindrical roller 208 in the axial direction beyond the center of that first cylindrical roller 208 in the axial direction. On the other hand, the center of curvature of each second end surface 282 is located on one side (adjacent to the first sliding contact portion) of the corresponding first cylindrical roller 208 in the axial direction beyond the center of that first cylindrical roller 208 in the axial direction.

In this way, the length of each first cylindrical roller 208 in the axial direction when the central axis of the first cylindrical roller 208 is inclined with respect to the axial direction is larger than the length of the first cylindrical roller 208 in the axial direction when the central axis of the first cylindrical roller 208 is parallel to the axial direction. In this way, when an axial load acts on each first cylindrical roller 208, the central axis of the first cylindrical roller 208 is hard to be inclined with respect to the axial direction.

The plurality of second cylindrical rollers 209 are circumferentially arranged between the third cylindrical raceway surface 273 of the outer ring 206 and the fourth cylindrical raceway surface 277 of the inner ring 207. Each of the second cylindrical rollers 209 has a fourth end surface 292 at one side in the axial direction. The fourth end surface 292 is in sliding contact with the third end surface 309 of the second member 241 of the inner ring 207. On the other hand, each of the second cylindrical rollers 209 has a third end surface 291 at the other side in the axial direction. The third end surface 291 is in sliding contact with an end surface 315 at one side of the first rib 271 of the outer ring 206 in the axial direction. The third end surface 309 of the second member 241 of the inner ring 207 constitutes a fourth guide face of the inner ring 207. The end surface 315 at one side of the first rib 271 of the outer ring 206 in the axial direction constitutes a third guide face of the outer ring 206.

In addition, a third sliding contact portion 320 of each second cylindrical roller 209 is in sliding contact with the end surface 315 of the outer ring 206. A fourth sliding contact portion 321 of each second cylindrical roller 209 is in sliding contact with the third end surface 309 of the inner ring 207. The third sliding contact portion 320 and the fourth sliding contact portion 321 are located radially outward, that is, on the same side in the radial direction, with respect to an orbital cylindrical plane of the second cylindrical rollers 209. The positions of the third sliding contact portions 320 in the radial direction substantially coincide with the positions of the fourth sliding contact portions 321 in the radial direction.

Although not described in detail, in the cross section taken in the axial direction, the third end surface 291 and fourth end surface 292 of each second cylindrical roller 209 each have a circular arc shape having the same radius with the center located on the center line of the second cylindrical roller 209 in the radial direction, and are respectively parts of different spherical surfaces. The center of curvature of each fourth end surface 292 is located on the other side (adjacent to the third sliding contact portion) of the corresponding second cylindrical roller 209 in the axial direction beyond the center of that second cylindrical roller 209 in the axial direction. On the other hand, the center of curvature of each third end surface 291 is located on one side (adjacent to the fourth sliding contact portion) of the corresponding second cylindrical roller 209 in the axial direction beyond the center of that second cylindrical roller 209 in the axial direction.

In this way, the length of each second cylindrical roller 209 in the axial direction when the central axis of the second cylindrical roller 209 is inclined with respect to the axial direction is larger than the length of the second cylindrical roller 209 in the axial direction when the central axis of the second cylindrical roller 209 is parallel to the axial direction. In this way, when an axial load acts on each second cylindrical roller 209, the central axis of the second cylindrical roller 209 is hard to be inclined with respect to the axial direction.

The C-shape snap ring 15 is fitted in the snap ring fitting groove 64. An end surface of the C-shape snap ring 15 adjacent to the first rib 271 is in contact with the first end surface 307 of the second member 241. In addition, in the first member 240 of the inner ring 207, an end surface opposite to the second member 241 side in the axial direction is in contact with the step 67 of the roll 1.

Although not described in detail, 268 is a lubricant supply hole that radially extends through the outer ring 206, and 269 is a lubricant supply hole that radially extends through the aligning ring 205. The lubricant supply hole 268 of the outer ring 206 is open to a peripheral groove of the outer ring 206, formed on the outer peripheral surface of the outer ring 206. The lubricant supply hole 268 is in fluid communication with the lubricant supply hole 269 of the aligning ring 205 via the peripheral groove of the outer ring 206. An end of the lubricant supply hole 269 of the aligning ring 205, opposite to the outer ring 206 side, is open to a peripheral groove formed in the aligning ring fitting groove 50 of the journal box inner surface. The lubricant supply hole 269 of the aligning ring 205 is in fluid communication with a lubricant supply passage of the housing member (not shown) via the peripheral groove of the aligning ring fitting groove 50 of the journal box inner surface. The lubricant supply passage extends through the housing member. Lubricant is poured from an opening of the lubricant supply passage, opposite to the lubricant supply hole 269 side. The poured lubricant flows through the lubricant supply passage, the lubricant supply hole 269 and the lubricant supply hole 268 into the double row cylindrical roller bearing 204.

In the above configuration, when the driven roll unit receives an axial load from the left side of the roll 1 toward the right side thereof on the sheet of FIG. 2, the driven roll unit transfers the axial load from the step 67 of the roll 1 via the second rib 244 of the first member 240, the first cylindrical rollers 208, the first rib 271 of the outer ring 206 and the aligning ring 205 to the end surface 97 of the axial protruding portion 32 of the cap 3, and then the axial load is withstood by the roll 1 and the housing member.

In addition, when the driven roll unit receives an axial load from the right side of the roll 1 toward the left side thereof on the sheet of FIG. 2, the driven roll unit transfers the axial load from the roll 1 via the C-shape snap ring 15, the second member 241, the second cylindrical rollers 209, the first rib 271 of the outer ring 206 and the aligning ring 205 to the step 90 of the journal box 2, and then the axial load is withstood by the roll 1 and the housing member.

With the double row cylindrical roller bearing 204 according to the second embodiment, the first cylindrical rollers 208 receive force directed radially inward as indicated by the arrow B in FIG. 2 by the sum of normal force received from the first guide face (end surface 305) and the second guide face (end surface 304). That is, the first cylindrical rollers 208 may be constantly pressed toward the inner ring 207 side, so it is possible to suppress inclination of the first cylindrical rollers 208. This can suppress edge contact of the first cylindrical rollers 208 with the first guide face (end surface 305) and the second guide face (end surface 304). Thus, it is possible to suppress occurrence of galling on the first or second guide face or on the end surfaces of the first cylindrical rollers 208.

In addition, in the double row cylindrical roller bearing 204 according to the second embodiment, the outer ring 206 has the first rib 271 that taperingly protrudes radially inward from the center of the inner peripheral surface of the outer ring 206 as it goes radially inward, while the inner ring 207 has the second rib 244 and the third rib 245 that protrude radially outward from both ends in the axial direction so that the guide faces slope inward in the axial direction as they go radially outward. However, in the aspect of the invention, it is also applicable that the outer ring has a second rib and a third rib that protrude radially inward from both ends in the axial direction so that the guide faces slope outward in the axial direction as they go radially inward, while the inner ring has a first rib that divergently protrudes radially outward from the center of the outer peripheral surface of the inner ring as it goes radially outward.

Note that, in the double row cylindrical roller bearing 4 according to the first embodiment or the double row cylindrical roller bearing 204 according to the second embodiment, the cylindrical rollers 8 and 9 or 208 and 209 are arranged in two rows, and the double row cylindrical roller bearing 4 or 204 has a shape that is substantially plane-symmetrical with respect to the perpendicular bisector plane of the outer ring; however, in the aspect of the invention, it is also applicable that the cylindrical rollers are arranged in two rows and the double row cylindrical roller bearing has a shape that is asymmetrical with respect to the perpendicular bisector plane of the outer ring. For example, one side of the double row cylindrical roller bearing with respect to the perpendicular bisector plane of the outer ring may have the shape of the double row cylindrical roller bearing 4 according to the first embodiment, and the other side of the double row cylindrical roller bearing with respect to the perpendicular bisector plane of the outer ring may have the shape of the double row cylindrical roller bearing 204 according to the second embodiment.

In addition, in an alternative embodiment (hereinafter, referred to as first alternative embodiment) to the first embodiment, the inner ring has the first rib at its center, and in an alternative embodiment (hereinafter, referred to as second alternative embodiment) to the second embodiment, the inner ring has the first rib at its center. In the aspect of the invention, it is also applicable that one side of the double row cylindrical roller bearing with respect to the perpendicular bisector plane of the outer ring has the shape of the double row cylindrical roller bearing according to the first alternative embodiment and the other side of the double row cylindrical roller bearing with respect to the perpendicular bisector plane of the outer ring has the shape of the double row cylindrical roller bearing according to the second alternative embodiment.

In addition, in the first or second embodiment, the rolling elements are the first cylindrical rollers 8 or 208 and the second cylindrical rollers 9 and 209. In the aspect of the invention, the rolling elements may be rolling elements, such as tapered rollers and convex rollers, other than cylindrical rollers.

In addition, in the first and second embodiments, the rolling bearing according to the aspect of the invention is arranged in the driven roll unit of the continuous casting machine. Instead, the rolling bearing according to the aspect of the invention may be arranged in a drive roll unit of the continuous casting machine. In addition, the rolling bearing according to the aspect of the invention may be arranged in any machines as long as the machines are used under a situation where an axial load and a rotation torque are applied, and the machines have a rolling bearing.

The invention claimed:

1. A rolling bearing comprising:
   a first raceway member that has a first raceway surface and a first rib located on one side of the first raceway surface in an axial direction;
   a second raceway member that has a first raceway surface and a first rib located on one side of the first raceway surface of the second raceway member in the axial direction, wherein the first rib of the second raceway member is located opposite to the first rib of the first raceway member in the axial direction; and
   a first rolling element that is arranged between the first raceway surface of the first raceway member and the first raceway surface of the second raceway member, wherein
   each first rib has a first guide face over which the first rolling element slides, and each first guide face has a constant sloped gradient that approaches a perpendicular bisector plane of the first raceway surface of the first raceway member as the constant sloped gradient moves outward in a radial direction in a cross section of the first raceway member taken in the axial direction or each first guide face has a constant sloped gradient that is spaced away from the perpendicular bisector plane of the first raceway surface of the first raceway member as the constant sloped gradient moves outward in the radial direction in the cross section of the first raceway member taken in the axial direction, and
   a first sliding contact portion of the first rolling element, which is in sliding contact with the first guide face of the first rib of the first raceway member and a second sliding contact portion of the first rolling element, which is in sliding contact with the first guide face of the first rib of the second raceway member, wherein the first sliding contact portion and the second sliding contact portion of the first rolling element are located on the same side in the radial direction with respect to an orbital annular plane of the first rolling element.

2. The rolling bearing according to claim 1, wherein a position of the first sliding contact portion in the radial direction substantially coincides with a position of the second sliding contact portion in the radial direction.

3. The rolling bearing according to claim 1, wherein the first guide face of the first rib of the first raceway member and the first guide face of the first rib of the second raceway member are substantially plane-symmetrical with respect to the perpendicular bisector plane.

4. The rolling bearing according to claim 1, wherein the rolling bearing is configured to transfer a load applied in an axial direction from the axial direction to a radial direction.

5. The rolling bearing according to claim 1, wherein the first rolling element is a roller that has a first end surface having a shape that constitutes part of a spherical surface,
   the first sliding contact portion is formed on the first end surface, and a center of curvature of the first end surface is located on a center line of the roller in a radial direction of the roller and is located on a side adjacent to the second sliding contact portion beyond a center of the roller in an axial direction of the roller.

6. The rolling bearing according to claim 5, wherein
the roller has a second end surface having a shape that constitutes part of a spherical surface,
the second sliding contact portion is formed on the second end surface, and
a center of curvature of the second end surface is located on the center line of the roller in the radial direction and is located on a side adjacent to the first sliding contact portion beyond the center of the roller in the axial direction.

7. The rolling bearing according to claim 1, wherein the first rolling element is a cylindrical roller.

8. The rolling bearing according to claim 7, wherein the cylindrical roller is a 1-piece cylindrical roller.

9. The rolling bearing according to claim 1, wherein
the first raceway member has a second raceway surface that is located on the opposite side of the first rib of the first raceway member from the first raceway surface of the first raceway member in the axial direction,
the second raceway member has a second raceway surface that faces the second raceway surface of the first raceway member in the radial direction and a second rib that is located on one side of the second raceway surface of the second raceway member such that the second rib of the second raceway member is opposite to the first rib of the first raceway member in the axial direction,
the roller bearing further comprising a second rolling element that is arranged between the second raceway surface of the first raceway member and the second raceway surface of the second raceway member, wherein
the first rib of the first raceway member has a second guide face over which the second rolling element slides and the second rib of the second raceway member has a first guide face over which the second rolling element slides, wherein when the first guide face of the first rib of the first raceway member is sloped to approach the perpendicular bisector plane of the first raceway surface of the first raceway member, the second guide face of the first rib of the first raceway member and the first guide face of the second rib of the second raceway member are each sloped to approach a perpendicular bisector plane of the second raceway surface of the first raceway member as the slope moves outward in the radial direction in the cross section of the first raceway member taken in the axial direction or when the first guide face of the first rib of the first raceway member is sloped to be spaced away from the perpendicular bisector plane of the first raceway surface of the first raceway member, the second guide face of the first rib of the first raceway member and the first guide face of the second rib of the second raceway member are each sloped to be spaced away from the perpendicular bisector plane of the second raceway surface of the first raceway member as the slope moves outward in the radial direction in the cross section of the first raceway member taken in the axial direction, and
a first sliding contact portion of the second rolling element, which is in sliding contact with the second guide face of the first rib of the first raceway member and a second sliding contact portion of the second rolling element, which is in sliding contact with the first guide face of the second rib of the second raceway member, wherein the first sliding contact portion and the second sliding contact portion of the second rolling element are located on the same side in the radial direction with respect to an orbital annular plane of the second rolling element.

10. The rolling bearing according to claim 9, wherein
a position of the first sliding contact portion of the second rolling element in the radial direction substantially coincides with a position of the second sliding contact portion of the second rolling element in the radial direction.

11. The rolling bearing according to claim 9, wherein
the second guide face of the first rib of the first raceway member and the first guide face of the second rib of the second raceway member are substantially plane-symmetrical with respect to the perpendicular bisector plane.

12. The rolling bearing according to claim 9, wherein
the second rolling element is a roller that has a first end surface having a shape that constitutes part of a spherical surface,
the first sliding contact portion of the second rolling element is formed on the first end surface, and
a center of curvature of the first end surface is located on a center line of the roller in a radial direction of the roller and is located on a side adjacent to the second sliding contact portion of the second rolling element beyond a center of the roller in an axial direction of the roller.

13. The rolling bearing according to claim 12, wherein
the roller has a second end surface having a shape that constitutes part of a spherical surface,
the second sliding contact portion of the second rolling element is formed on the second end surface of the second rolling element, and
a center of curvature of the second end surface is located on a center line of the roller in a radial direction of the roller and is located on a side adjacent to the first sliding contact portion of the second rolling element beyond a center of the roller in an axial direction of the roller.

14. The rolling bearing according to claim 9, wherein both the first rolling element and the second rolling element are cylindrical rollers.

15. The rolling bearing according to claim 14, wherein both of the cylindrical rollers are 1-piece cylindrical rollers.

16. The rolling bearing according to claim 9, wherein the second guide face of the first rib of the first raceway member and the first guide face of the second rib of the second raceway member are sloped at a constant sloped gradient.

* * * * *